US010301118B2

(12) United States Patent
Tiedemann (10) Patent No.: US 10,301,118 B2
(45) Date of Patent: May 28, 2019

(54) CONVEYOR DEVICE FOR CONVEYOR INSTALLATIONS, A MODULAR SYSTEM, AND A METHOD FOR PRODUCING SUCH A CONVEYOR DEVICE

(71) Applicant: INTERROLL HOLDING AG, Sant' Antonino (CH)

(72) Inventor: Hauke Tiedemann, Köln (DE)

(73) Assignee: INTERROLL HOLDING AG, Sant' Antonino (CH)

( * ) Notice: Subject to any disclaimer, the term of this patent is extended or adjusted under 35 U.S.C. 154(b) by 0 days.

(21) Appl. No.: 15/522,366

(22) PCT Filed: Oct. 21, 2015

(86) PCT No.: PCT/EP2015/074372
§ 371 (c)(1),
(2) Date: Aug. 3, 2017

(87) PCT Pub. No.: WO2016/066495
PCT Pub. Date: May 6, 2016

(65) Prior Publication Data
US 2018/0009607 A1  Jan. 11, 2018

(30) Foreign Application Priority Data

Oct. 30, 2014 (DE) .......... 10 2014 222 171

(51) Int. Cl.
*B65G 13/06* (2006.01)
*B65G 23/08* (2006.01)

(52) U.S. Cl.
CPC ............. *B65G 23/08* (2013.01); *B65G 13/06* (2013.01); *B65G 2201/04* (2013.01); *B65G 2207/30* (2013.01)

(58) Field of Classification Search
CPC ................................ B65G 23/08; B65G 13/06
USPC ................................ 198/788, 789, 791, 835
See application file for complete search history.

(56) References Cited

U.S. PATENT DOCUMENTS

| 6,117,318 | A  | * | 9/2000 | Simonelli | ................. B03C 1/28 |
| | | | | | 184/6.25 |
| 6,240,335 | B1 | | 5/2001 | Wehrung et al. | |
| 6,672,449 | B2 | * | 1/2004 | Nakamura | ............. B65G 23/08 |
| | | | | | 198/788 |
| 7,207,433 | B2 | | 4/2007 | Schaefer | |

(Continued)

FOREIGN PATENT DOCUMENTS

| AT | 13066 | 5/2013 |
| CN | 2033808 U | 3/1989 |

(Continued)

*Primary Examiner* — William R Harp
(74) *Attorney, Agent, or Firm* — Price Heneveld LLP (57) ABSTRACT

A conveyor system for conveying containers, pallets and the like, or bulk material comprises a drum tube which extends along a longitudinal axis and has a first end and a second end opposite the first end, an electrical drive unit which is designed to exert a conveyor torque from a first axle onto the drum tube, a cartridge tube secured torque-resistantly and coaxially in the drum tube, and a cover rotatably mounted on the first axle and which covers one end of the cartridge tube. The electrical drive unit is arranged inside the cartridge tube and the cartridge tube is secured coaxially inside the drum tube.

11 Claims, 8 Drawing Sheets

(56) References Cited

U.S. PATENT DOCUMENTS

| | | | |
|---|---|---|---|
| 8,006,829 B2* | 8/2011 | Itoh | B65G 23/08 198/788 |
| 8,381,901 B2* | 2/2013 | Yamamoto | B65G 13/02 198/788 |
| 8,757,363 B2 | 6/2014 | Combs et al. | |
| 9,359,142 B2* | 6/2016 | Jepsen | B65G 23/08 |
| 9,618,056 B2* | 4/2017 | Itoh | F16D 3/64 |
| 9,731,900 B2* | 8/2017 | Ruggeri | B65G 23/08 |
| 2012/0175223 A1 | 7/2012 | Breen et al. | |
| 2018/0009607 A1 | 1/2018 | Tiedemann | |

FOREIGN PATENT DOCUMENTS

| | | |
|---|---|---|
| CN | 2199164 Y | 5/1995 |
| CN | 203682423 U | 7/2014 |
| DE | 20 2012 000 793 | 4/2012 |
| DE | 102010044027 | 5/2012 |
| DE | 102011004802 | 8/2012 |
| DE | 102015106026 | 8/2016 |
| DE | 102015106034 | 10/2016 |
| DE | 102015106024 | 11/2016 |
| DE | 102015107167 | 11/2016 |
| EP | 1454851 | 9/2004 |
| EP | 1656312 | 5/2006 |
| EP | 3212543 A1 | 9/2017 |
| WO | 2013/000006 | 1/2013 |
| WO | 2013000006 A2 | 1/2013 |
| WO | 2014/057984 | 4/2014 |
| WO | 2016066495 A1 | 5/2016 |
| WO | 2016169982 | 10/2016 |
| WO | 2016169986 | 10/2016 |
| WO | 2016177906 | 10/2016 |
| WO | 2018009607 A1 | 1/2018 |

* cited by examiner

CONVEYOR DEVICE FOR CONVEYOR INSTALLATIONS, A MODULAR SYSTEM, AND A METHOD FOR PRODUCING SUCH A CONVEYOR DEVICE

CROSS-REFERENCE TO FOREIGN PRIORITY APPLICATION

The present application claims the benefit of PCT Application No. PCT/EP2015/074372 filed Oct. 21, 2015, entitled "Conveyor Device for Conveyor Installations, a Modular System, and a Method for Producing Such a Conveyor Device."

FIELD OF THE INVENTION

The invention relates to a conveyor, in particular a conveyor roller, for conveyor systems for conveying containers, pallets and the like, or bulk material, comprising a drum tube which extends along a longitudinal axis and has a first end and a second end opposite said first end, and an electrical drive unit which is designed to exert a conveyor torque from a first axle onto the drum tube. The invention further relates to a modular system for constructing a conveyor of a desired length and to a method for producing such a conveyor.

BACKGROUND OF THE INVENTION

Conveyors of this type are used for different purposes in logistics applications. A conveyor according to the invention may be a drum motor, for example, or a motorised roller having a drum body. Accordingly, a drum body can also be understood to be a supporting tube or outer tube of a motorised roller or roller body.

Drum motors are deployed, for example, in such a way that they are mounted in a frame by means of an axle, which is then attached stationarily in relation to the frame and torque-resistantly to the frame. The drum body rotatably mounted on an axle is driven and made to rotate by means of a drive unit inside the drum body. The drive unit is supported by the axle and is connected to the drum body on the driven side. The drum motor can be used to drive other devices, for example, a conveyor line consisting of a plurality of conveyor rollers, by means of a belt or the like. The drum motor can also be used directly as a conveyor element in a conveyor line and can carry the conveyed item and convey it by rotation of the drum body. One preferred use is to dispose the drum motor as a drive element at the end of a conveyor belt system and to drive a conveyor belt, which is partly wound around the drum body, and to make it move by rotation of the drum body. Another use consists in disposing the drum motor as a drive element in the middle of the lower run, with the conveyor belt being wound partly around and driven by the drum body.

Drum motors with different driving power are known from the prior art. The driving power ranges from about 10 W to 6 KW and can transmit a torque of up to 1000 Nm via the drum body. Due to their particular construction, drum motors are characterised by the specific problem of heat being difficult to dissipate from the drive means, which is disposed inside the drum body for compact construction. For some drum motors with high power ratings, filling the drum body with oil is, therefore, an established technique in the prior art for ensuring that the drum motor remains thermally stable even under heavy loads. However, due to higher levels of efficiency, it is possible in some cases to dispense with filling the drum body with oil even when such components are used. A gearless electrical drum motor having a plurality of electrical stator windings and a shared, permanently excited rotor or an identical number of mechanically connected, permanently excited series of rotors is known from DE 20 2012 000 793 U1. The single electrical stator windings are connected electrically and mechanically in such a way that they can be connected individually or collectively in order to adjust the power of the drum motor to the load requirements.

In contrast to drum motors, motorised rollers for roller drives are generally equipped with a drum body of smaller diameter, referred to here as a drum tube, and typically have a power rating of less than 100 W, typically in the range between 10 and 40 W. Such roller drives are used to carry and convey items in roller conveyor lines. Roller conveyors can be combined with a plurality of idle rollers arranged in parallel, which are driven by the motor-driven conveyor roller via a belt drive or chain drive, as the case may be. In curved roller conveyors, the rollers are arranged with their axes at an angle to each other.

The drum motors and roller drives can be used, for example, to convey pallets, to convey parcels in parcel dispatch centres, to convey containers in depots of various kinds, or for transporting luggage in airports, and in numerous other applications.

The invention is based on the realisation that conveyors must be produced in different lengths according to the field of application, depending, for example, on the size of the items being conveyed or on conditions on the specific premises. According to the prior art, producing conveyors of different lengths is only economical if a limited assortment of conveyors is offered in different, discrete lengths. Fulfilling individual customer wishes concerning the length of a conveyor invariably makes production more complex and expensive, in that customised sizes of conveyor rollers must be designed. This is a general problem that arises, particularly when supplying spare parts for defective rollers, or when small follow-up deliveries are made.

SUMMARY OF THE INVENTION

The object of the present invention is, therefore, to provide and produce a conveyor of the kind initially specified, which can easily be provided with customised lengths easily and without any special manufacturing effort.

This object is achieved, according to the invention, by a conveyor of the kind initially described, having a drive cartridge comprising a cartridge tube which is secured torque-resistantly and coaxially in the drum tube and a cover which is rotatably mounted on the first axle and which covers one end of the cartridge tube, the electrical drive unit being arranged inside the cartridge tube and said cartridge tube being secured coaxially inside the drum tube.

The drum tube is preferably in the form of a hollow cylinder and consists of a material which allows the drum tube to be cut individually to a desired length while simultaneously having sufficient strength for the conveyor to be used in conveyor systems. Such a material may preferably consist of steel, aluminium and/or plastic (e.g. polyvinyl chloride (PVC)). An inner surface of the drum tube is preferably cylindrical in shape.

The circumferential surface of the cartridge tube is preferably cylindrical and has an outer diameter which is approximately equal to the inner diameter of the drum tube. The cover covers one end of the cartridge tube, preferably sealingly, and preferably has an outer diameter which is greater than the inner diameter of the drum tube. These dimensions allow the drive cartridge to be preferably insertable through the second end of the drum tube into the drum tube until the cover abuts the second end of the drum tube like a flange. The cartridge tube and the cover may be designed as an integral unit. It is preferable that the cartridge tube and the cover are formed from two pieces.

The drive unit preferably has a stator and a rotor. The drive unit is preferably arranged coaxially with the cartridge tube. The first axle is connected torque-resistantly to the stator. In the context of the present invention, the "first axle" is to be understood as an abstract axis of rotation and preferably as a cover element which is rotatably mounted about the longitudinal axis, for example by means of a rolling bearing. The rolling bearing is preferably provided in the form of a precision oiled or greased bearing conforming to DIN 625 (DIN: the German standardisation body), and is made of Niro steel, for example. It is also preferable that the axle of the cover has a through hole through which a supply line for the electrical drive unit extends. The through hole is preferably formed by a bore or recess extending longitudinally in the axle, in particular a cylindrical hole having a diameter which allows the supply line to pass through. This allows the drive unit to be supplied with electrical energy using a particularly simple and advantageous design.

It is further preferred that the rotor be arranged inside the stator. The stator preferably has coil windings and is surrounded by the cartridge tube, which rotates around the stator when in operation. The torque is transmitted from the rotor to the cartridge tube and the cover by means of a gear, in particular a spur gear transmission. When asynchronous motors are used, as is preferable, the rotor has a so-called squirrel cage. However, synchronous motors are also used, in which permanent magnets are arranged in the rotors.

One key advantage of the conveyor according to the invention is that it is possible to use a standardised drive cartridge to produce conveyors of different lengths. A core concept behind the invention is to use the same, prefabricated drive cartridge to produce conveyors of different lengths. Other elements required to produce the conveyor, such as the drum tube, differ partly in design. The expression "drive cartridge" is to be understood here as an element whose dimensions remain the same in different conveyors and which is inserted into drum tubes of different lengths to form the conveyor. The expression "drive insert" can also be used synonymously for "drive cartridge".

According to one preferred embodiment of the inventive conveyor, the cover extends into the cartridge tube and has an outer diameter in a flange portion outside the cartridge tube which is equal to the outer diameter of the drum tube.

The cover preferably consists of two portions, namely the flange portion and an insertion portion. The flange portion sealingly covers the second end of the cartridge tube. When the conveyor is in the assembled state, the flange portion covers the second end of the drum tube. The insertion portion of the cover preferably projects into an interior of the cartridge tube and has an outer diameter which provides an interference fit for the insertion portion in the cartridge tube. The cover preferably forms one element of the prefabricated drive cartridge.

At its end face, the cover may have one or more oil holes extending through the cover into the cartridge tube. The oil holes are used to feed oil into or to remove oil from the interior of the drum tube.

According to another preferred embodiment of the inventive conveyor, a torque-resistant connection between the cartridge tube and the drum tube has or is formed by an interference fit between the outer diameter of the cartridge tube and the inner diameter of the drum tube. An "interference fit" (pressure fit) is preferably to be understood to mean that the outer diameter of the cartridge tube is equal to or even slightly greater than the inner diameter of the drum tube. These relative sizes are chosen in such a way that the cartridge tube can be pressed into the drum tube during production, but such that a torque-resistant connection is formed between the cartridge tube and the drum tube when the conveyor is in operation.

According to a preferred development of the embodiment described above, the torque-resistant connection between the cartridge tube and the drum tube has an adhesive bond. As an alternative, the torque-resistant connection between the cartridge tube and the drum tube is formed by said adhesive bond. For example, an adhesive producing the torque-resistant connection may be provided between an outer surface of the cartridge tube and an inner surface of the drum tube.

In another preferred embodiment of the inventive conveyor, the cartridge tube has an insert cover at one end, which is rotatably mounted on a second axle by means of a rolling bearing, said second axle having a recess at an end face of the cartridge tube for receiving a stub shaft. The insert cover is preferably inserted into the cartridge tube at one end that is opposite the end at which the flange portion is arranged, that is, the end face is one that faces away from the cover. The recess is preferably designed to receive the stub shaft torque-resistantly. This can be done by the stub shaft being received in the recess with a precise fit or with an interference fit. The recess is preferably in the form of a blind hole in the second axle, said blind hole being form rotationally symmetrically about the longitudinal axis. In the context of the present invention, the "second axle" is to be understood as an abstract axis of rotation and preferably as an insert cover element which is rotatably mounted about the longitudinal axis, for example, by means of a rolling bearing. The rolling bearing is preferably in the form of a precision oiled or greased bearing conforming to DIN 625, for example, of Niro steel.

According to a development of the embodiment described above, the cartridge tube and the insert cover extend through the drum tube from the first to the second end of the drum tube, with the stub shaft projecting from the first end of the drum tube. To that end, the drum tube has a length which is equal to the total length of the cartridge tube and the insert cover in the axial direction. The insert cover simultaneously forms a covering for the end of the drum tube, with the stub shaft projecting from the insert cover and thus from the drum tube. This development is the shortest conveyor which can be produced in accordance with the invention. The length of the drive cartridge thus forms a lower limit for a conveyor, according to the invention, that is, the drum tube forms the outer circumferential surface of the conveyor, e.g., for conveying containers, pallets, and the like. At one end of the conveyor, the first axle projects in the direction of the longitudinal axis for mounting the conveyor in a conveyor frame. At another end of the conveyor, the stub shaft projects in the longitudinal axial direction for mounting the conveyor in a conveyor frame. In other words, the conveyor provided in accordance with this development of the invention is rotatably mounted in a conveyor frame, when in operation, at its first end by means of the stub shaft and at its second end by means of the first axle. The portions of the stub shaft and the first axle projecting from the ends of the conveyor are preferably in the form of axles with spanner flats, which have parallel lateral cuttings at the ends of the axles. These axles with spanner flats fit into matching profiles having open elongate holes.

According to another preferred embodiment of the inventive conveyor, the drum tube has a drum tube cover at the first end, which is rotatably mounted on a third axle by means of a rolling bearing, wherein the third axle is designed as a bushing for the stub shaft and one end of said stub shaft projects from the drum tube cover. The drum tube cover preferably has an insertion portion and a flange portion. The insertion portion is inserted into the drum tube until the flange portion abuts the first end of the drum tube. In the context of the present invention, the "third axle" is to be understood as an abstract axis of rotation and preferably as a drum tube cover element which is rotatably mounted about the longitudinal axis, for example, by means of a rolling bearing. The rolling bearing is preferably in the form of a precision oiled or greased bearing conforming to DIN 625, for example, of Niro steel. It is also preferable that the axle has a through hole, in particular, a cylindrical hole, through which the stub shaft extends in the assembled state. The stub shaft preferably has an outer diameter in one portion, which allows it to pass with a precise fit through the through hole, thus counteracting any forces acting on the stub shaft transversely to its axial direction. It is also preferred that the stub shaft is connected torque-resistantly to the third axle. The through hole is preferably formed by a through bore or axle recess extending in the axial direction, in particular by a cylindrical hole having a diameter which matches the outer diameter of the stub shaft in that portion.

According to one development of the embodiment described above, the stub shaft extends in the assembled state through the third axle and projects into the recess in the second axle to be received therein. An embodiment is thus provided specifically for medium lengths of conveyor according to the present invention. The drum tube has a length which is greater than the length of the cartridge tube. At these lengths, the stub shaft is sufficiently long to extend through the third axle in the drum tube cover and to project into the second axle in the insert cover. Due to this structure, the stub shaft is stabilised not only by the bushing in the third axle, but also by its being received preferably with a precision fit in the second axle.

According to a further variant of the development of the conveyor described above, the stub shaft has a diameter in an intermediate section between the drum tube cover and the insert cover, which prevents the intermediate section from being received into the second and/or the third axle, respectively, in the assembled state. A distance spacer is thus provided between the drum tube cover and the insert cover, in that the diameter of the stub shaft bar, measured transversely to the longitudinal axis, is greater in each case than the diameter of the bushing in the third axle and/or than the diameter of the recess in the second axle. This simultaneously allows the conveyor to be easily assembled. The intermediate section can thus serve as a stop member for inserting the stub shaft into the recess of the second axle. The intermediate section can simultaneously serve as a stop member for inserting the drum tube cover into the drum tube. Preferably, the dimensions of the intermediate section in the direction of the longitudinal axis are such that said intermediate section provides a distance spacer between the cartridge tube and the drum tube cover, with which both the cartridge tube of the drive cartridge and the insertion portion of the drum tube cover can be fully inserted into the drum tube, in particular, until the cover portion of the drive cartridge abuts the second end of the drum tube and/or until the flange portion of the drum tube cover abuts the first end of the drum tube.

According to an alternative development of the embodiment described above, the conveyor has an insert member which is designed to be inserted into the drum tube and which is rotatably mounted on a fourth axle, wherein the fourth axle is designed to receive the stub shaft and the stub shaft extends in the assembled state through the third axle and projects into the fourth axle. An embodiment is thus provided for relatively long conveyors. The insert member may have an outer diameter, for example, which is approximately equal to or slightly greater than the inner diameter of the drum tube (interference fit), the insert member being inserted torque-resistantly into the drum tube, for example, by an interference fit or by an adhesive bond. It is further preferred that the insert member is arranged adjacent to the drum tube cover inside the drum tube. The fourth axle preferably has a recess in the form of a blind hole or, preferably, in the form of a through hole into which the stub shaft extends. When viewed in the longitudinal axial direction from the perspective of the insert member, the stub shaft extends through the drum tube cover and projects from the drum tube cover at the first end of the drum tube. According to this development, the insert member may be spaced an arbitrary distance from the cartridge tube in the longitudinal axial direction, as long as the stability of the drum tube permits. According to this development, therefore, it is possible for relatively long conveyors to be provided.

According to a further aspect of the invention, the object specified at the outset is achieved by a modular system for constructing a conveyor of a desired length, in particular, a conveyor of the kind described above, comprising a drum tube which can be produced with a desired length and having a first end and a second end opposite said first end, a drive cartridge comprising a cartridge tube which is designed to be received torque-resistantly into the drum tube, and a cover which is rotatably mounted on a first axle and which covers one end of the cartridge tube, wherein a drive unit for exerting a conveyor torque from the first axle onto the drum tube is arranged coaxially inside the cartridge tube, wherein the cartridge tube has an insert cover at one end, which is rotatably mounted on a second axle by means of a rolling bearing, wherein said second axle has a recess at the end face of the cartridge tube for torque-resistantly receiving a stub shaft, and selectively a drum tube cover which is rotatably mounted on a third axle by means of a rolling bearing, wherein the third axle is designed as a bushing for the stub shaft, and/or selectively an insert member which is designed to be inserted into the drum tube and is rotatably mounted on a fourth axle by means of a rolling bearing, wherein the fourth axle is designed to receive the stub shaft.

It is further preferred that the modular system comprises a plurality of drum tubes of different lengths. The various elements of the modular system may be selectively assembled, depending on the desired conveyor length, to form a conveyor. It is still further preferred that the modular system comprises a plurality of stub shafts of varying design. For conveyors having the smallest or a medium length, in particular, the stub shaft is designed to be received in the second axle. For very long conveyors, the stub shaft is designed to be received in the fourth axle.

According to a preferred embodiment of the modular system, the drum tube provided for constructing a conveyor of the smallest length has a length which is substantially equal to the length of the cartridge tube, and the stub shaft provided is one which is received in the assembled state in the recess of the second axle, wherein to construct a conveyor of medium length, at least the drum tube cover is provided, wherein the stub shaft is received in the assembled state in the recess of the second axle of the insert cover and extends through the third axle and projects from the drum tube cover, and/or wherein to construct a very long conveyor, at least the drum tube cover and the insert member are provided, wherein the stub shaft extends in the assembled state through the third axle of the drum tube cover and projects into the axle to be accommodated therein.

To build a conveyor of the smallest length, the stub shaft is preferably received torque-resistantly in the recess of the second axle. To build a conveyor of medium length, it is further preferred that stub shaft is received torque-resistantly in the recess of the second axle, in the assembled state. To build a very long conveyor, the stub shaft preferably also projects into the fourth axle, in the assembled state, so as to be received torque-resistantly therein.

In other words, if a conveyor having the smallest possible length is desired, a drum tube is used which is equal to the length of the cartridge tube. Such a length can also be understood as one which is slightly greater than the length of the cartridge tube, namely the total length of the cartridge tube and the flange portion of the insert cover. The stub shaft can be received by the cartridge tube and thus projects out of the drum tube. To build a conveyor whose length is greater than that of the cartridge tube, a drum tube cover is additionally required. Depending on the length of the conveyor, the stub shaft may extend through a recess in the third axle of the drum tube cover and into the second axle of the insert cover. In the case of relatively long conveyors, an additional insert member is provided which receives, with its fourth axle, and, in particular, torque-resistantly, the stub shaft, which projects through the third axle of the drum tube cover and then out of the drum tube cover. The insert member provides additional stabilisation of the stub shaft against forces acting transversely to the axial direction.

According to the embodiment of the modular system as described above, the following elements are required in order to construct conveyors having customised lengths:
- a standardised drive cartridge;
- three different stub shafts;
- a drum tube which can be cut to a desired length;
- a drum tube cover; and
- an insert member.

According to another aspect of the invention, the object specified at the outset is achieved by a method for producing a conveyor, in particular a conveyor according to any one of the preceding claims, said method comprising the steps of:
(a) providing a drum tube which extends along a longitudinal axis and has a first end and a second end opposite said first end, wherein the drum tube is provided with a length depending on the desired length of the conveyor,
(b) providing a drive cartridge comprising a cartridge tube which is designed to be received torque-resistantly and coaxially into the drum tube, and a cover which is rotatably mounted on a first axle and which covers one end of the cartridge tube,
(c) inserting the cartridge tube into the drum tube through the second end until the cover abuts the second end of the drum tube.

The special feature of the method according to the invention is that conveyors having customised lengths can be produced with a limited number of steps, each of which are simple and routine for those skilled in the art. A drum tube with the desired length is preferably provided by cutting a drum tube blank to a desired length. In embodiments in which the drum tube forms the outer peripheral surface of the conveyor, the length of the drum tube is substantially equal to the length of the conveyor to be produced. In the case of a conveyor with the smallest length, the length of the conveyor is substantially equal to the length of the cartridge tube plus the length of the cover portion. In the case of a conveyor of medium to very long length, the length of the conveyor is substantially equal to the length of the drum tube plus the length of the cover portion and the length of the flange portion of the drum tube cover projecting from the drum tube.

According to one preferred embodiment of the method according to the invention, the method includes the further steps of:
(d) inserting an insert cover into the cartridge tube at one end, in particular before inserting the cartridge tube into the drum tube, wherein the insert cover is rotatably mounted on a second axle by means of a rolling bearing, wherein said second axle has a recess at an end face of the cartridge tube for receiving a stub shaft, and
(e) inserting the stub axle into the recess of the second axle.

The aforementioned steps are specifically used to produce a conveyor of the smallest length. The individual steps may be carried out in any order, or may overlap in time. Step (d) may be performed before or also after step (c), but preferably before step (c). Step (e) may be carried out before or after step (c) and/or step (d), but preferably after step d) and before step (c). The cartridge tube is preferably inserted into a drum tube having a length which is equal to the length of the cartridge tube. In this case, after the stub shaft has been inserted into the recess of the second axle and after the cartridge tube has been inserted into the drum tube, the stub shaft projects from the drum tube at the first end of the latter. The conveyor produced in accordance with this method can then be rotatably mounted in a conveyor frame by means of the stub shaft and the first axle projecting from the cover portion.

According to another preferred embodiment of the method according to the invention, a drum tube cover is mounted on a third axle, the third axle being designed as a bushing for a stub shaft and the method comprising the further steps of:
(f) inserting an insert cover into the cartridge tube at one end, in particular before inserting the cartridge tube into the drum tube, wherein the insert cover is rotatably mounted on a second axle, wherein said second axle has a recess at an end face of the cartridge tube for receiving a stub shaft,
(g) inserting the drum tube cover into the drum tube at the first end of the drum tube,
(h) guiding the stub axle through the third axle, and
(i) inserting the stub axle into the recess of the second axle.

The aforementioned steps are specifically used to produce a conveyor of medium length. The individual steps may be carried out in any order, or may overlap in time. Steps (g), (h), and (i), in particular, may be carried out in any order. Steps (h) and (i) preferably overlap in time, meaning that one end of the stub shaft enters into the recess in the second axle and is inserted into it while the stub shaft is being passed through the third axle. It is also possible, as an alternative to the aforementioned order of steps, that the stub shaft is firstly introduced into the recess of the second axle after step (f). While the drum tube cover is being inserted into the drum tube, the stub shaft is passed simultaneously through the third axle. Regardless of the order in which the aforementioned steps (g), (h), and (i) are carried out, the stub shaft is designed in such a way that it projects in the assembled state from the drum tube cover. The conveyor thus produced can thus be mounted, by means of the stub shaft and the first axle projecting from the cover portion, on a conveyor frame for use.

According to another preferred embodiment of the method according to the invention, a drum tube cover is mounted on a third axle, the third axle being designed as a bushing for a stub shaft and the method further comprising the steps of:

(j) inserting an insert member into the drum tube, wherein the insert member is rotatably mounted on a fourth axle and the fourth axle has a recess for receiving the stub shaft, (k) inserting the drum tube cover into the drum tube at the first end of the drum tube, (l) guiding the stub axle through the third axle, and (m) inserting the stub shaft into the recess of the fourth axle.

The aforementioned steps are specifically used to produce a very long conveyor. The individual steps may be carried out in any order, or may overlap in time. Step (j) preferably follows step (c) or is carried out before step (c). Steps (k), (l), and (m) may be carried out in any order. Steps (l) and (m) may also overlap in time, meaning that one end of the stub shaft enters into the recess in fourth axle and is inserted into it while the stub shaft is being passed through the third axle. As an alternative to the aforementioned order, the stub shaft may be inserted into the recess in the fourth axle after step (j) has been performed, and after that the drum tube cover is introduced into the drum tube and the stub shaft is passed simultaneously through the third axle. The stub shaft is designed in such a way that it projects in the assembled state from the drum tube cover.

As regards the advantages, embodiment variants, and embodiment details of the method according to the present disclosure and its possible further developments, reference is made to the description provided herein of the respective features, as will be understood and appreciated by those skilled in the art upon studying the following specification, claims, and appended drawings.

BRIEF DESCRIPTION OF THE DRAWINGS

Preferred embodiments of the invention shall now be described by way of example and with reference to the attached Figures, in which.

DETAILED DESCRIPTION OF THE PREFERRED EMBODIMENTS

As referenced in the Figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Figures 1, 2:
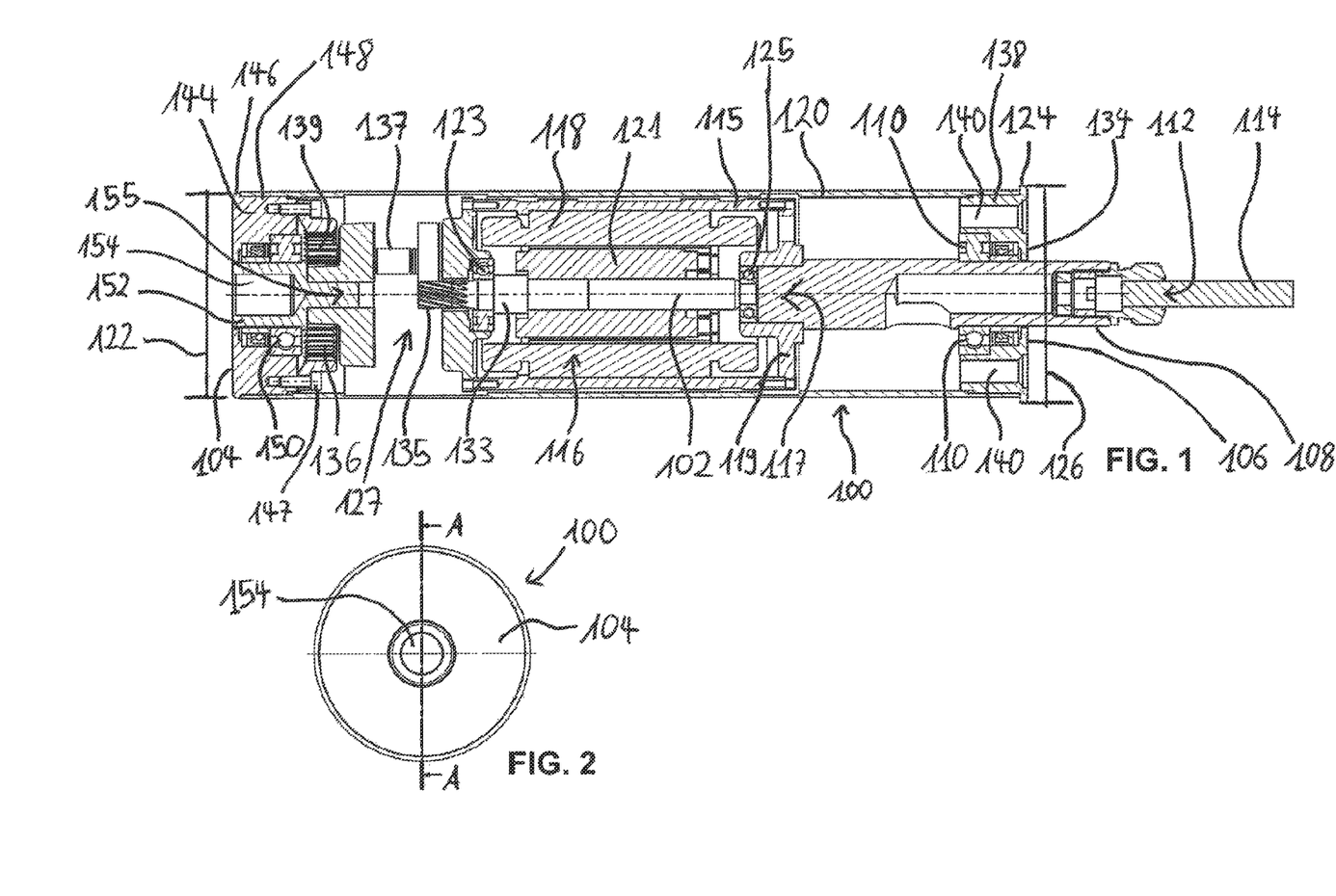
FIG. 1 is a lateral cross-sectional view of an embodiment of a drive cartridge according to the invention.
FIG. 2 is an end view of the drive cartridge shown in FIG. 1.
Figure 3:
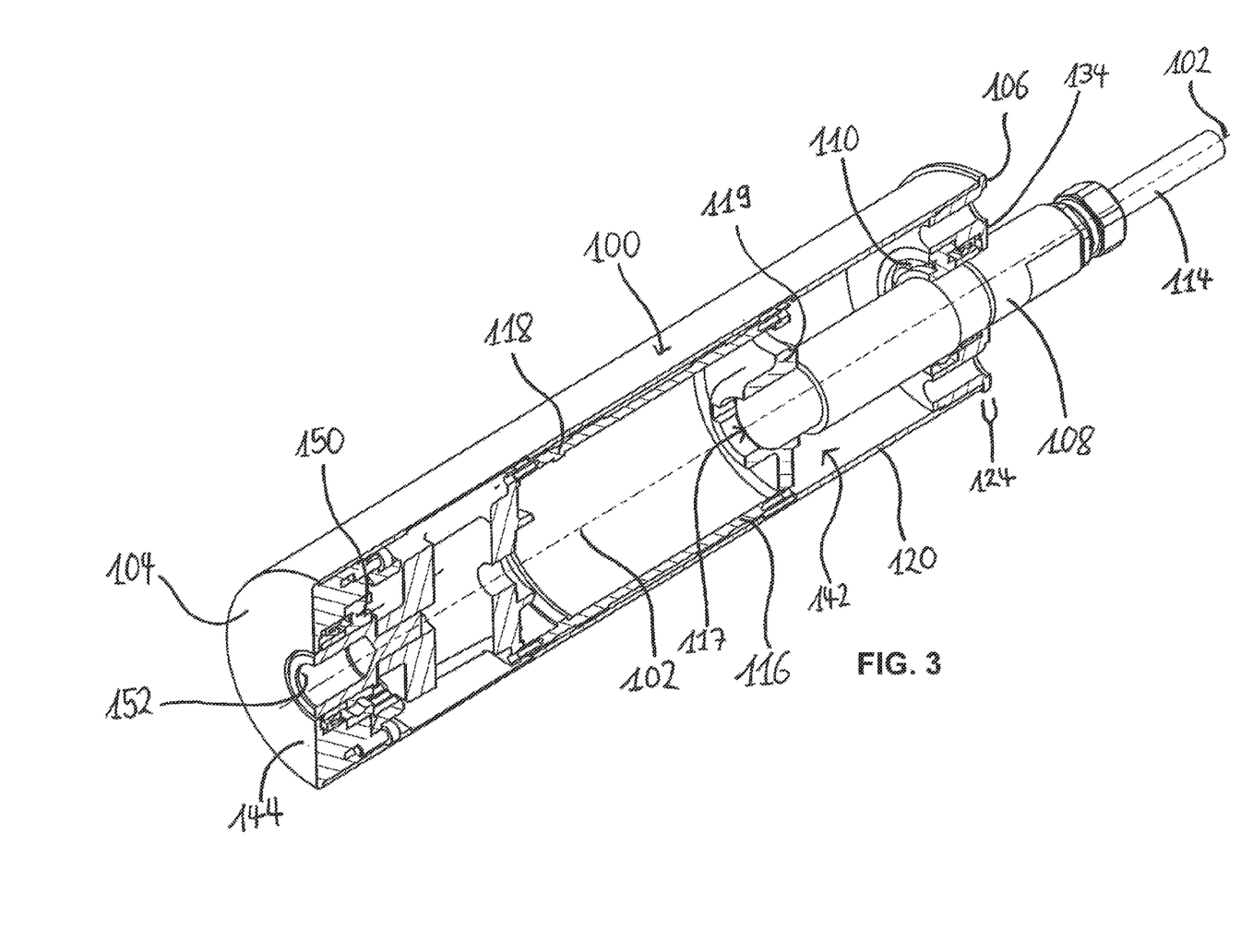
FIG. 3 is a perspective view of a partial cross-sectional view of the drive cartridge shown in FIG. 1.
Figure 4:
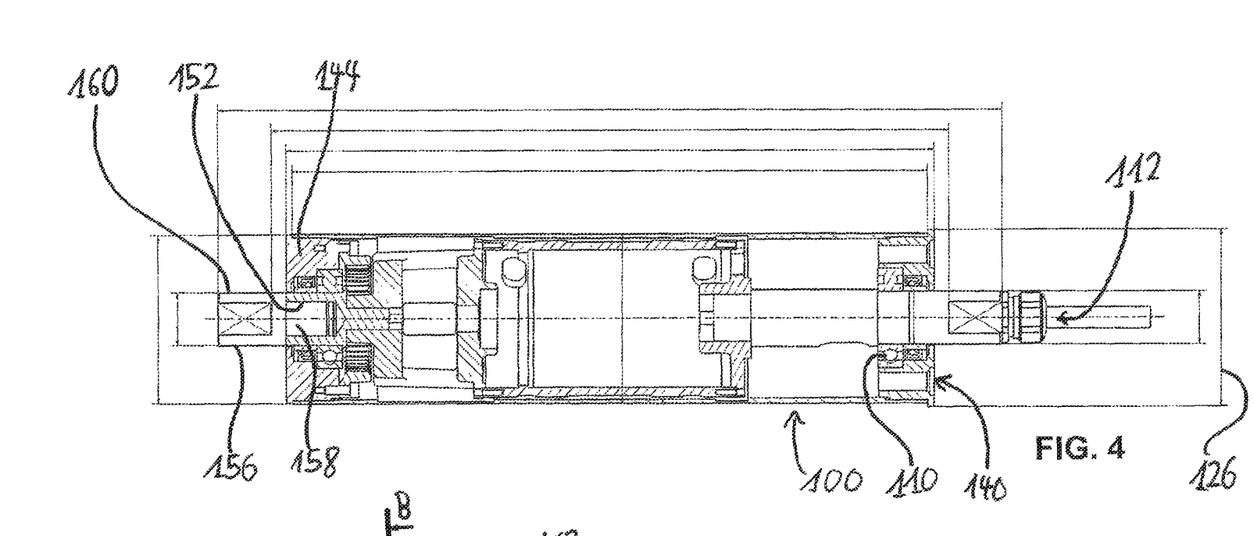
FIG. 4 is a lateral partial cross-sectional view of the drive cartridge with a stub shaft as shown in FIGS. 1-3.
Figure 5:
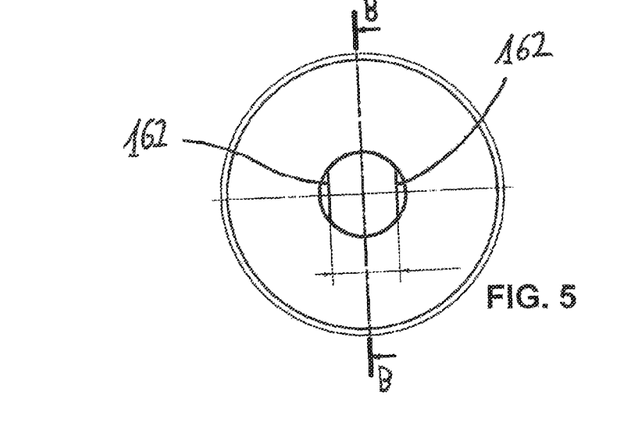
FIG. 5 is an end view of the drive cartridge shown in FIG. 4.

The drive cartridge 100 in FIGS. 1 to 5 is shown 6 in cross-section in FIG. 4, in which the sectional plane lies in line A-A shown in FIG. 2 and in line B-B shown in FIG. 5, respectively. Drive cartridge 100 extends in each case along a longitudinal axis 102 between a first end 104 and a second end 106. FIG. 2 shows an end view of the first end 104 of drive cartridge 100, viewed in the direction of longitudinal axis 102.

Drive cartridge 100 is mounted rotatably about longitudinal axis 102 on a first axle 108 by means of a rolling bearing 110. First axle 108 has a through hole 112 through which a supply line 114 for supplying an electrical drive unit 116 with electrical energy extends. In operation, first axle 108 and supply line 114 are statically mounted in a conveyor system (not shown).

Drive cartridge 100 has a cartridge tube 120 which has a cylindrical circumferential surface with a first diameter 122 and which extends along longitudinal axis 102. Cartridge tube 120 extends from the first end 104 to a flange portion 124 of a cover 134, said flange portion 124 having a second diameter 126 which is greater than the first diameter 122. In operation, cartridge tube 120 and cover 134 of drive cartridge 100 general rotate about longitudinal axis 102. Inside cartridge tube 120, drive unit 116 is arranged coaxially with cartridge tube 120. Drive unit 116 is supplied with electrical energy by means of supply line 114. Drive unit 116 has a stator housing 115 in which a stator 118 coupled torque-resistantly to first axle 108 is arranged. The coupling between first axle 108 and stator 118 is provided by receiving first axle 108 torque-resistantly in a recess 117 of a cover 119 of stator housing 115. Drive unit 116 also has a rotor 121, which is enclosed by stator 118 and stator housing 115. Rotor 121 is connected torque-resistantly to a rotor shaft 133. Rotor shaft 133 is rotatably mounted in stator housing 115 by means of two rolling bearings 123, 125 and projects into a spur gear 127. In one end portion of rotor shaft 133, a helical gear 135 is formed which transfers a torque onto another wheel (not shown). The torque is transferred to a gear wheel 139 by means of a shaft 137. Gear wheel 139 engages with an internally toothed gear ring 136. Gear ring 136 is connected torque-resistantly to cartridge tube 120. The torque of rotor 121 is transmitted in this way to cartridge tube 120.

An insertion portion 138 of cover 134 projects into cartridge tube 120 in such a way that an outer surface of insertion portion 138 is connected torque-resistantly to an inner surface of cartridge tube 120. Cover 134 has oil holes 140, which extend from the first end 106 of drive cartridge 100 into an interior 142 of cartridge tube 120.

An insert cover 144 having a flange portion 146 and an insertion portion 148 which projects into cartridge tube 120 is arranged in the region of the first end 104. Gear ring 136 is securely joined to insertion portion 148 by a screw connection 147. Insert cover 144 is mounted rotatably about longitudinal axis 102 on a second axle 152 by means of a rolling bearing 150. A blind hole 154 forms a recess in the second axle 152. Blind hole 154 is designed to receive a stub shaft 156 shown in FIGS. 4 to 6. Second axle 152 is connected torque-resistantly to stator housing 115. To that end, second axle 152 projects torque-resistantly into a recess 155 in the stator housing.

Figure 6:
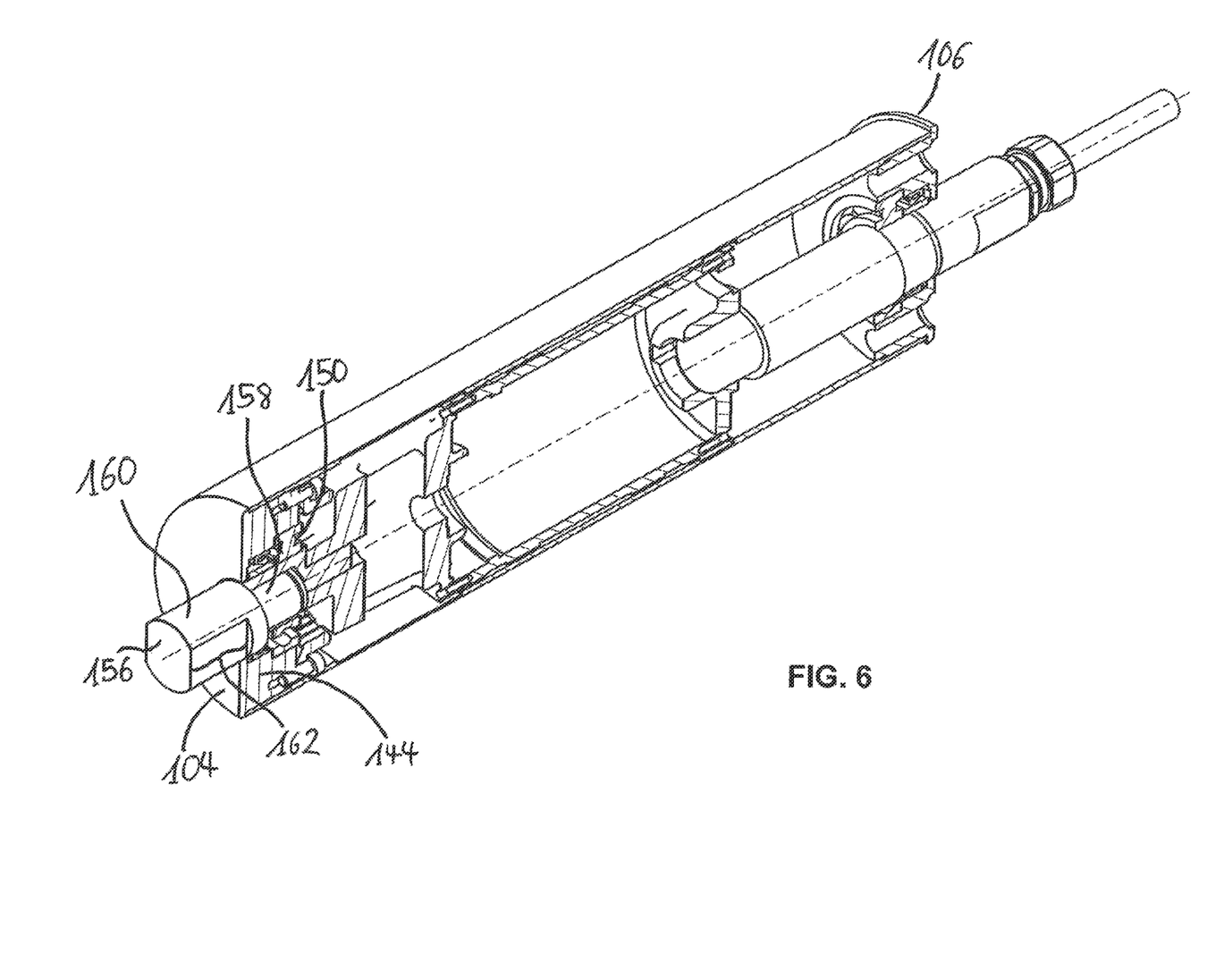
FIG. 6 is a perspective view of a partial cross-sectional view of the drive cartridge shown in FIG. 4.

FIGS. 4 to 6 show the drive cartridge 100 of FIGS. 1 to 3, in combination with stub shaft 156. Stub shaft 156 contains an insertion portion 158, which is dimensioned to be received in blind hole 154. In addition, stub shaft 156 contains a mounting section 160 which is dimensioned for torque-resistant mounting of a conveyor, produced using drive cartridge 100, in a conveyor frame (not shown). For that purpose, portions of mounting section 160 have a cylindrical circumferential surface having flattened and planar milled recesses 162 for torque-resistant accommodation in the conveyor frame.

To produce a conveyor, a drum tube (not shown) is pushed over cartridge tube 120, or cartridge tube 120 is inserted into a drum tube. The drum tube has a length which is equal to the total length of cartridge tube 120 and flange portion 148 when insert cover 144 is inserted. Cartridge tube 120 may be inserted into the drum tube before or after stub shaft 156 is inserted into blind hole 154.

Figure 7:
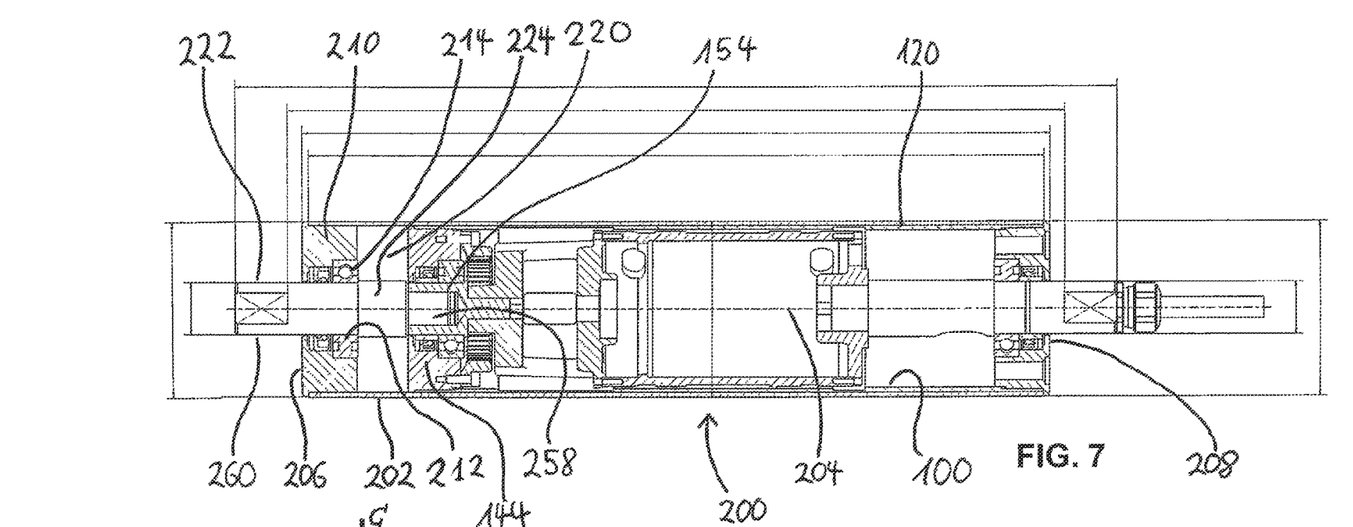
FIG. 7 is a lateral partial cross-sectional view of a first embodiment of a conveyor according to the invention.
Figure 8:
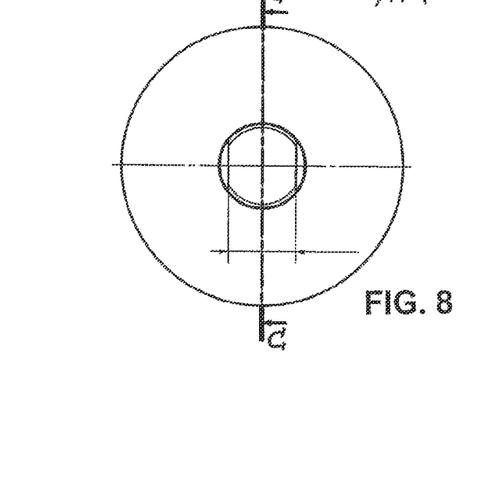
FIG. 8 is an end view of the conveyor shown in FIG. 7.
Figure 9:
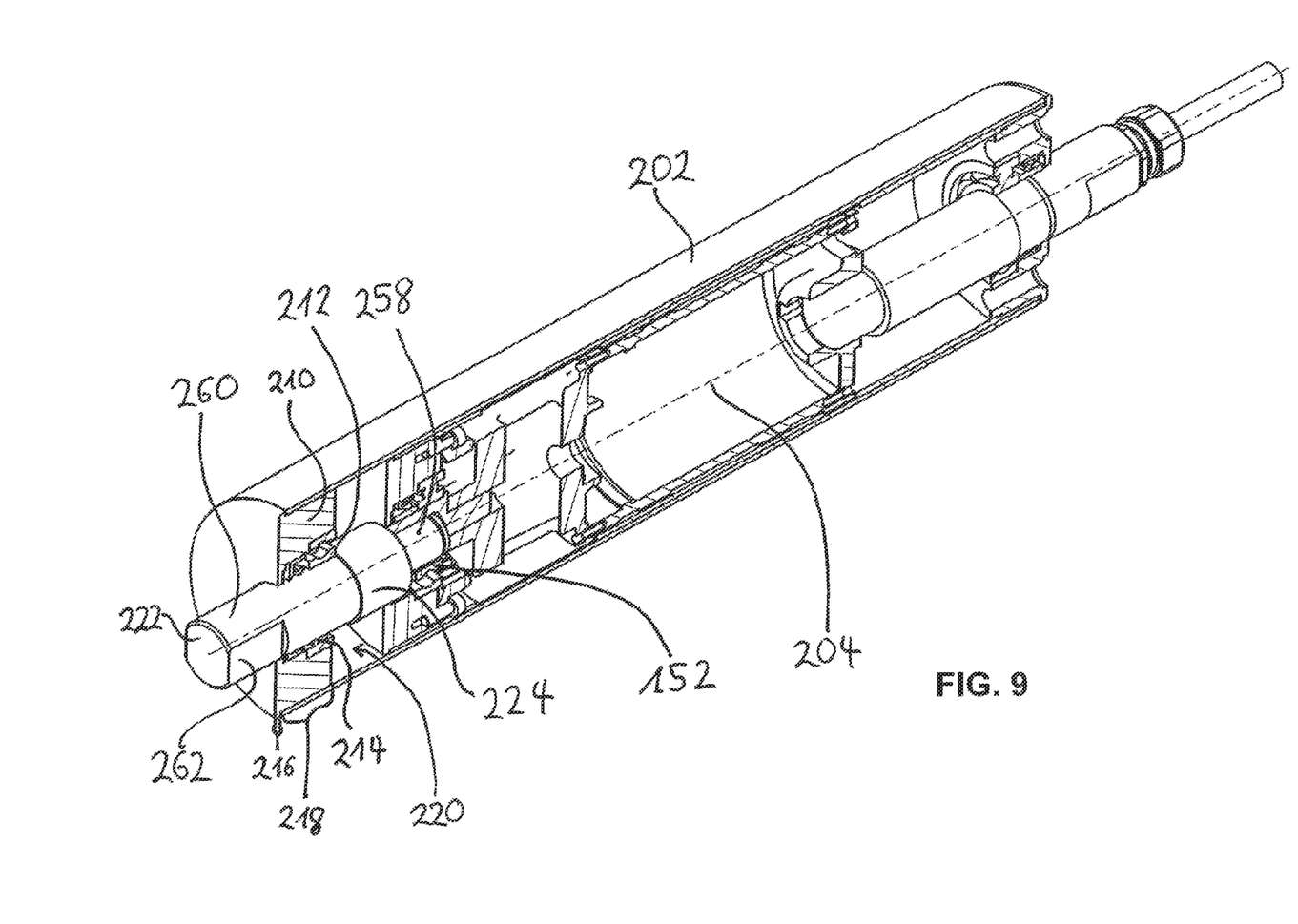
FIG. 9 is a perspective view of a partial cross-sectional view of the conveyor shown in FIG. 7.

FIGS. 7 to 9 show a first embodiment of an inventive conveyor 200. In the partial cross-sectional view shown in FIGS. 7 and 9, the sectional plane lies along line C-C shown in FIG. 8. Conveyor 200 contains the drive cartridge 100 shown in FIGS. 1 to 3. Identical elements are marked with the same reference signs.

FIG. 7 shows a drum tube 202 which extends along a longitudinal axis 204 and has a first end 206 and a second end 208 opposite said first end 206 of drum tube 202 in the direction of longitudinal axis 204. At its first end 206, conveyor 200 has a drum tube cover 210 which is mounted rotatably about longitudinal axis 204 on a third axle 212 by means of a rolling bearing 214. Drum tube cover 210 has a flange portion 216 and an insertion portion 218. In the assembled state, insertion portion 218 projects into an inner space 220 in drum tube 202. Flange portion 216 forms a cover for the first end 206 of drum tube 202. Third axle 212 provides a bushing for a stub shaft 222. Stub shaft 222 has an insertion portion 258, which is designed to be received in blind hole 154. For that purpose, the inner diameter of blind hole 154 matches the outer diameter of insertion portion 258. An intermediate section 224 of stub shaft 222 has an outer diameter which is greater than the inner diameter of blind hole 154 and of the bushing in third axle 212. In the axial direction, intermediate section 224 abuts insertion portion 258 and in the assembled state is arranged between insert cover 144 and drum tube cover 210. A mounting section 260 of stub shaft 222 extends through the bushing of third axle 212 and has a substantially cylindrical circumferential surface in one area. In an end region of mounting section 260, flattened, planar milled recesses 262 are provided, which are used for torque-resistant mounting of mounting section 260 in a conveyor frame (not shown).

The drive cartridge 100 shown in FIGS. 7 to 9 extends from the second end 208 of the drum tube into the inner space 220 of the drum tube. An outer surface of cartridge tube 120 contacts an inner surface of the drum tube thereby. A torque-resistant connection between cartridge tube 120 and drum tube 202 is formed by an interference fit, meaning the outer diameter of cartridge tube 120 is slightly greater than the inner diameter of drum tube 202, such that cartridge tube 120 can be inserted into drum tube 202 with a force which is greater in amount than a maximum force acting in the direction of rotation at the transition between cartridge tube 120 and drum tube 202 when the conveyor is in operation. In this way, a torque-resistant connection is provided for operation between cartridge tube 120 and drum tube 202. The torque-resistant connection between cartridge tube 120 and drum tube 202 is also provided by an adhesive between the outer surface of cartridge tube 120 and the inner surface of drum tube 202.

Figure 10:
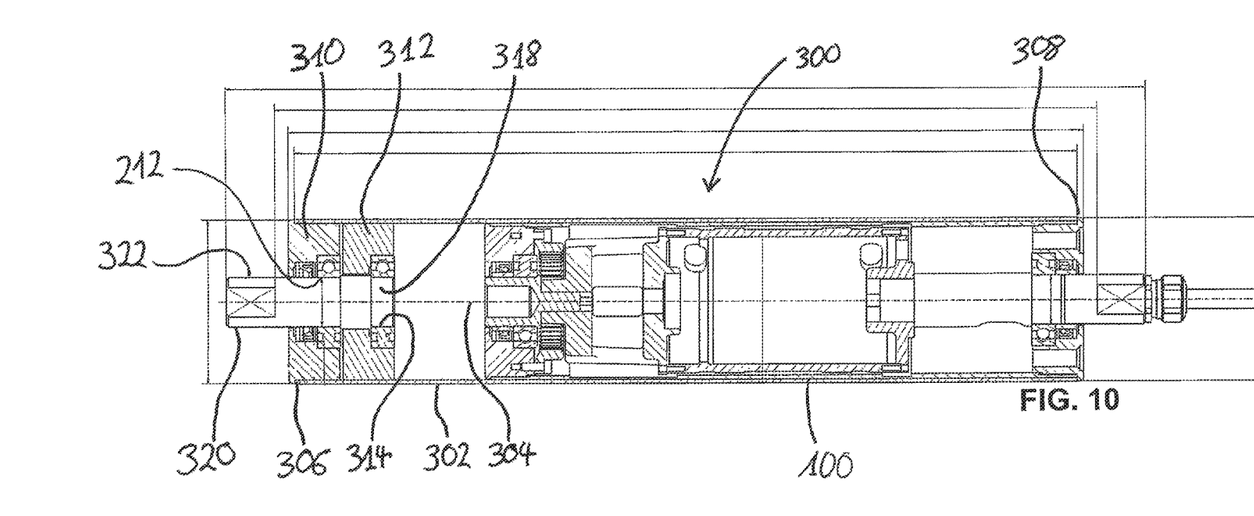
FIG. 10 is a lateral partial cross-sectional view of a second embodiment of a conveyor according to the invention.
Figure 11:
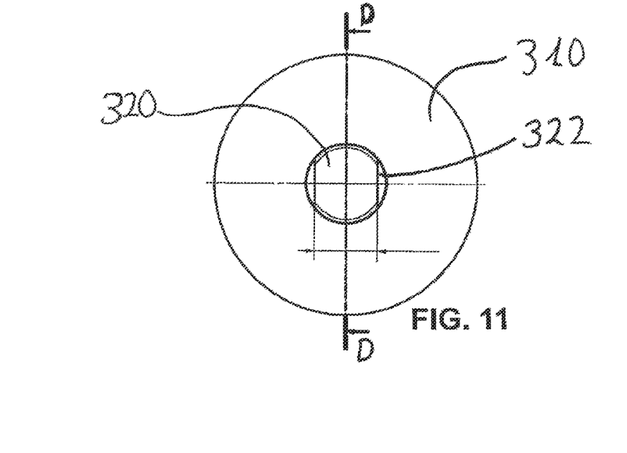
FIG. 11 is an end view of the conveyor shown in FIG. 10.
Figure 12:
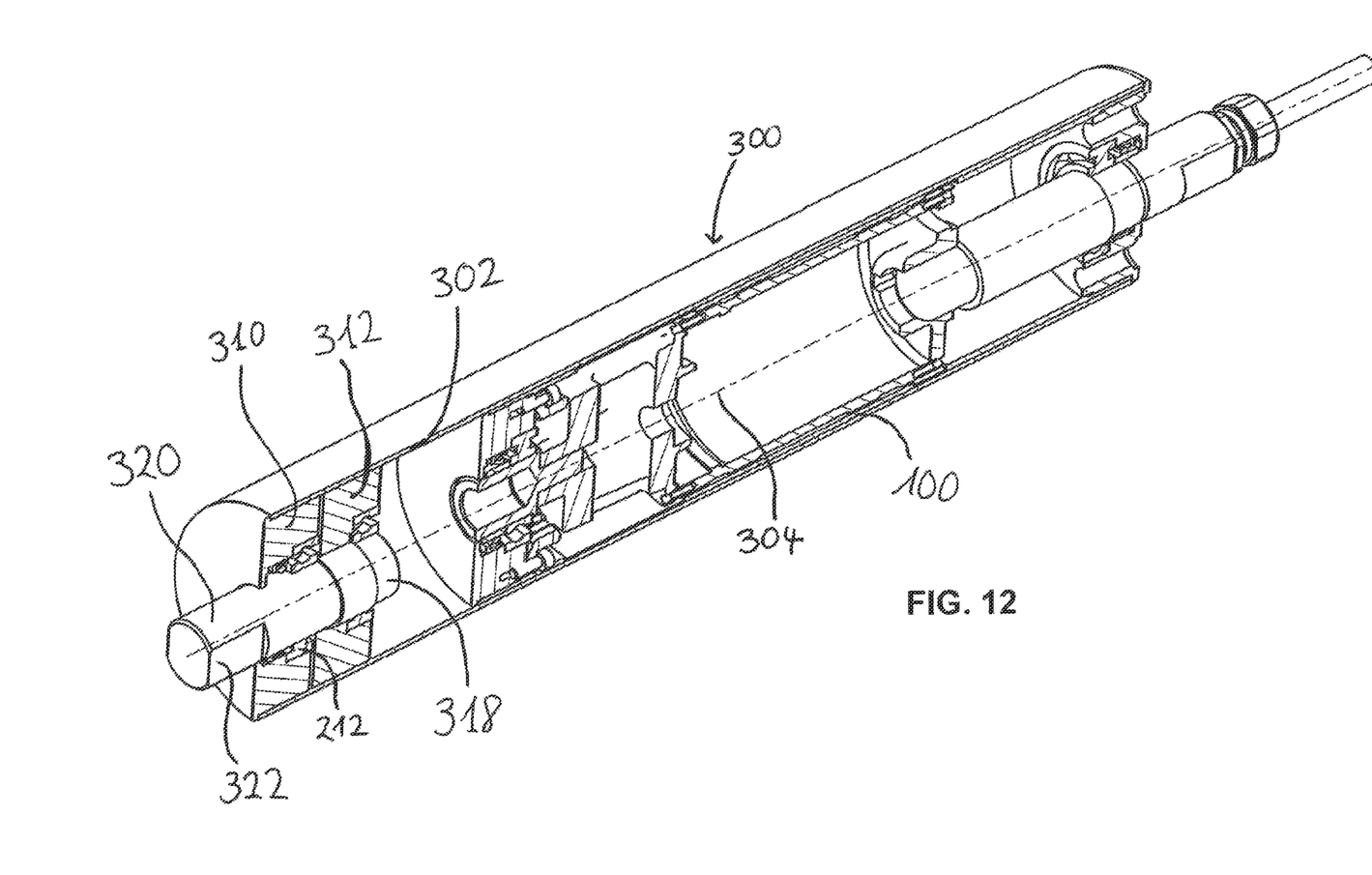
FIG. 12 is a perspective view of a partial cross-sectional view of the conveyor shown in FIG. 10.

FIGS. 10 to 12 show a second embodiment of an conveyor 300 according to the invention, in particular for building very long conveyors. In the partial cross-sectional view shown in FIGS. 10 and 12, the die sectional plane lies along line D-D in FIG. 11. The drive cartridge 100 shown in FIGS. 10 to 12 corresponds to the drive cartridge shown in FIGS. 1 to 9. Identical elements are marked with the same reference signs.

A drum tube 302 extends along a longitudinal axis 304 and has a first end 306 and a second end 308. A drum tube cover 310 has the same structure as the drum tube cover 210 shown in FIGS. 7 to 9. Identical elements are marked with the same reference signs. An insert member 312 is arranged inside drum tube 302 adjacent to drum tube cover 310. Insert member 312 is mounted rotatably about longitudinal axis 304 on a fourth axle 314. The fourth axle 314 has a bushing into which an insertion portion 318 of a stub shaft 320 is torque-resistantly received. Stub shaft 320 extends through the bushing in third axle 212 and projects with a mounting section 322 from drum tube cover 310. Mounting section 322 is used for mounting conveyor 300 in a conveyor frame. The outer shape of mounting section 322 is the same as the outer shape of mounting section 160 or 260, as shown in FIGS. 4 to 6 and 7 to 9, respectively. The second embodiment of a conveyor according to the invention, as shown in FIGS. 10 to 12, is particularly suitable for building very long conveyors. Insert member 312 serves to stabilise stub shaft 320 against forces acting transversely to longitudinal axis 304. One importance difference in the second embodiment, compared to the first embodiment, is that the drum tube has a length with which it makes design sense to provide insert member 312—instead of a stub shaft which extends through drum tube 210, as shown in FIGS. 7 to 8, and which projects into the blind hole 154 of second axle 152. Instead, one end of the stub shaft facing away from mounting section 322 projects into the bushing of fourth axle 314.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A conveyor for conveyor systems for conveying containers, pallets and the like, or bulk material comprising:
   a drum tube which extends along a longitudinal axis and has a first end and a second end opposite said first end;
   an electrical drive unit designed to exert a conveyor torque from a first axle onto the drum tube, wherein a drive cartridge comprising a cartridge tube is secured torque-resistantly and coaxially in the drum tube; and
   a cover rotatably mounted on the first axle and which covers one end of the cartridge tube,
   wherein the electrical drive unit is arranged inside the cartridge tube, said cartridge tube is secured coaxially inside the drum tube, the cartridge tube has an insert cover at one end rotatably mounted on a second axle by means of a rolling bearing, said second axle having a recess at an end face of the cartridge tube and a stub shaft received within the recess, and the cartridge tube and the insert cover extend through the drum tube from the first to the second end of the drum tube and the stub shaft projects from the first end of the drum tube.

2. A conveyor for conveyor systems for conveying containers, pallets and the like, or bulk material comprising:
   a drum tube which extends along a longitudinal axis and has a first end and a second end opposite said first end;
   an electrical drive unit designed to exert a conveyor torque from a first axle onto the drum tube, wherein a drive cartridge comprising a cartridge tube is secured torque-resistantly and coaxially in the drum tube; and
   a cover rotatably mounted on the first axle and which covers one end of the cartridge tube,
   wherein the electrical drive unit is arranged inside the cartridge tube, said cartridge tube is secured coaxially inside the drum tube, the cartridge tube has an insert cover at one end rotatably mounted on a second axle by means of a rolling bearing, said second axle having a recess at an end face of the cartridge tube and a stub shaft received within the recess, and the drum tube has a drum tube cover at the first end, which is rotatably mounted on a third axle by means of a rolling bearing, wherein the third axle is designed as a bushing for the stub shaft and one end of said stub shaft projects from the drum tube cover.

3. The conveyor according to claim 2, wherein the stub shaft extends in the assembled state through the third axle and projects into the recess in the second axle to be received therein.

4. The conveyor according to claim 3, wherein the stub shaft has a diameter in an intermediate section between the drum tube cover and the insert cover, wherein the stub shaft diameter prevents the intermediate section from being received into the second and/or the third axle, respectively, in the assembled state.

5. The conveyor according to claim 2, further comprising an insert member designed to be inserted into the drum tube and which is rotatably mounted on a fourth axle by means of a rolling bearing, wherein the fourth axle is designed to receive the stub shaft, and
   wherein the stub shaft extends in the assembled state through the third axle and projects into the fourth axle.

6. A modular system for constructing a conveyor of a desired length comprising:
   a drum tube having a desired length and having a first end and a second end opposite said first end;
   a drive cartridge comprising a cartridge tube received torque-resistantly into the drum tube;

a cover rotatably mounted on a first axle and which covers one end of the cartridge tube; and a drive unit for exerting a conveyor torque from the first axle onto the drum tube arranged coaxially inside the cartridge tube;

wherein the cartridge tube has an insert cover at one end rotatably mounted on a second axle by a rolling bearing, said second axle having a recess at the end face of the cartridge tube and a stub shaft torque-resistantly received within the recess, and a drum tube cover rotatably mounted on a third axle by means of a rolling bearing, wherein the third axle is designed as a bushing for the stub shaft.

7. The system of claim 6, further comprising an insert member designed to be inserted into the drum tube and rotatably mounted on a fourth axle by a rolling bearing, wherein the fourth axle is designed to receive the stub shaft.

8. A modular system for constructing a conveyor of a desired length comprising:

a drum tube having a desired length and having a first end and a second end opposite said first end;

a drive cartridge comprising a cartridge tube received torque-resistantly into the drum tube;

a cover rotatably mounted on a first axle and which covers one end of the cartridge tube; and a drive unit for exerting a conveyor torque from the first axle onto the drum tube arranged coaxially inside the cartridge tube;

wherein the cartridge tube has an insert cover at one end rotatably mounted on a second axle by a rolling bearing, said second axle having a recess at the end face of the cartridge tube and a stub shaft torque-resistantly received within the recess, and wherein the drum tube provided to construct a conveyor of the smallest length has a length which is substantially equal to the length of the cartridge tube, and the stub shaft provided is one which is received in the assembled state in the recess of the second axle, and wherein to construct a conveyor of medium length, at least the drum tube cover is provided, wherein the stub shaft is received in the assembled state in the recess of the second axle of the insert cover and extends through a third axle and projects from the drum tube cover, and to construct a very long conveyor, at least the drum tube cover and the insert member are provided, wherein the stub shaft extends in the assembled state through the third axle of the drum tube cover and projects into the axle to be accommodated therein.

9. A method for producing a conveyor, said method comprising the steps of:

providing a drum tube which extends along a longitudinal axis and has a first end and a second end opposite said first end, and wherein the drum tube is provided with a length depending on the desired length of the conveyor;

providing a drive cartridge comprising a cartridge tube which is torque-resistantly and coaxially received into the drum tube, and a cover which is rotatably mounted on a first axle and which covers one end of the cartridge tube;

inserting the cartridge tube into the drum tube through the second end until the cover abuts the second end of the drum tube;

inserting an insert cover into the cartridge tube at one end before inserting the cartridge tube into the drum tube, wherein the insert cover is rotatably mounted on a second axle by means of a rolling bearing and said second axle has a recess at an end face of the cartridge tube for receiving a stub shaft, and inserting the stub shaft into the recess of the second axle.

10. A method for producing a conveyor, said method comprising the steps of:

providing a drum tube which extends along a longitudinal axis and has a first end and a second end opposite said first end, and wherein the drum tube is provided with a length depending on the desired length of the conveyor;

providing a drive cartridge comprising a cartridge tube which is torque-resistantly and coaxially received into the drum tube, and a cover which is rotatably mounted on a first axle and which covers one end of the cartridge tube;

inserting the cartridge tube into the drum tube through the second end until the cover abuts the second end of the drum tube;

inserting an insert cover into the cartridge tube at one end before inserting the cartridge tube into the drum tube, wherein the insert cover is rotatably mounted on a second axle and said second axle has a recess at an end face of the cartridge tube for receiving a stub shaft;

inserting a drum tube cover into the drum tube at the first end of the drum tube, wherein the drum tube cover is mounted on a third axle and the third axle is designed as a bushing for the stub shaft;

guiding the stub shaft through the third axle; and inserting the stub shaft into the recess of the second axle.

11. A method for producing a conveyor, said method comprising the steps of:

providing a drum tube which extends along a longitudinal axis and has a first end and a second end opposite said first end, and wherein the drum tube is provided with a length depending on the desired length of the conveyor;

providing a drive cartridge comprising a cartridge tube which is torque-resistantly and coaxially received into the drum tube and a cover which is rotatably mounted on a first axle and which covers one end of the cartridge tube;

inserting the cartridge tube into the drum tube through the second end until the cover abuts the second end of the drum tube;

inserting an insert cover into the cartridge tube at one end before inserting the cartridge tube into the drum tube, wherein the insert cover is rotatably mounted on a second axle by means of a rolling bearing;

providing a third axle, wherein the third axle is designed as a bushing for a stub shaft;

inserting an insert member into the drum tube, wherein the insert member is rotatably mounted on a fourth axle and the fourth axle has a recess for receiving the stub shaft;

inserting a drum tube cover into the drum tube at the first end of the drum tube, wherein the drum tube cover is mounted on the third axle;

guiding the stub shaft through the third axle; and inserting the stub shaft into the recess of the fourth axle.

* * * * *